United States Patent
Zhu et al.

(10) Patent No.: US 8,910,269 B2
(45) Date of Patent: *Dec. 9, 2014

(54) SYSTEM, METHOD, AND COMPUTER PROGRAM PRODUCT FOR PREVENTING COMMUNICATION OF UNWANTED NETWORK TRAFFIC BY HOLDING ONLY A LAST PORTION OF THE NETWORK TRAFFIC

(71) Applicant: McAfee, Inc., Santa Clara, CA (US)

(72) Inventors: Garrick Zhu, Fremont, CA (US); Zheng Bu, Fremont, CA (US)

(73) Assignee: McAfee, Inc., Santa Clara, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 13/892,023

(22) Filed: May 10, 2013

(65) Prior Publication Data

US 2013/0263248 A1 Oct. 3, 2013

Related U.S. Application Data

(63) Continuation of application No. 13/210,070, filed on Aug. 15, 2011, now Pat. No. 8,448,232, which is a continuation of application No. 12/573,768, filed on Oct. 5, 2009, now Pat. No. 8,024,462.

(51) Int. Cl.
| | | |
|---|---|---|
| *G06F 15/16* | (2006.01) | |
| *G06F 15/173* | (2006.01) | |
| *G06F 15/177* | (2006.01) | |
| *H04L 29/06* | (2006.01) | |

(52) U.S. Cl.
CPC ............................... *H04L 63/0245* (2013.01)
USPC .......... 726/13; 726/1; 726/5; 726/22; 726/24; 713/188

(58) Field of Classification Search
CPC .................................................. H04L 63/0245
USPC ........ 726/13, 12, 22–24, 5; 713/188; 709/224
See application file for complete search history.

(56) References Cited

U.S. PATENT DOCUMENTS

| | | | |
|---|---|---|---|
| 7,065,657 B1 * | 6/2006 | Moran | 726/5 |
| 7,386,884 B2 * | 6/2008 | Cohen et al. | 726/22 |
| 7,673,324 B2 * | 3/2010 | Tirosh et al. | 726/1 |
| 8,448,232 B1 | 5/2013 | Zhu et al. | |
| 2005/0235160 A1 * | 10/2005 | Cohen et al. | 713/188 |
| 2006/0156403 A1 * | 7/2006 | Haeffele et al. | 726/23 |
| 2006/0288418 A1 * | 12/2006 | Yang et al. | 726/24 |
| 2008/0086776 A1 | 4/2008 | Tuvell et al. | |
| 2008/0162592 A1 | 7/2008 | Huang et al. | |
| 2009/0144822 A1 * | 6/2009 | Shi | 726/22 |
| 2010/0011031 A1 * | 1/2010 | Huang et al. | 707/202 |
| 2010/0017879 A1 * | 1/2010 | Kuegler et al. | 726/23 |
| 2010/0235916 A1 * | 9/2010 | Radatti | 726/24 |

* cited by examiner

*Primary Examiner* — Haresh N Patel
(74) *Attorney, Agent, or Firm* — Wong Cabello Lutsch Rutherford & Brucculeri LLP

(57) ABSTRACT

A system, method, and computer program product are provided for preventing communication of unwanted network traffic by holding only a last portion of the network traffic. In use, network traffic associated with a file transfer is received. Additionally, only a last portion of the network traffic associated with the file transfer is held for determining whether the file is unwanted. Further, the last portion of the network traffic associated with the file transfer is conditionally forwarded to a destination device, based on the determination.

20 Claims, 5 Drawing Sheets

SYSTEM, METHOD, AND COMPUTER PROGRAM PRODUCT FOR PREVENTING COMMUNICATION OF UNWANTED NETWORK TRAFFIC BY HOLDING ONLY A LAST PORTION OF THE NETWORK TRAFFIC

CROSS-REFERENCE TO RELATED APPLICATIONS

This application is a continuation of U.S. patent application Ser. No. 13/210,070 filed on Aug. 15, 2011, now U.S. Pat. No. 8,448,232, which is a continuation of U.S. patent application Ser. No. 12/573,768, filed on Oct. 5, 2009, now U.S. Pat. No. 8,024,462, the entire content of which is herein incorporated by reference.

FIELD OF THE INVENTION

The present invention relates to security systems, and more particularly to network security systems.

BACKGROUND

In the past, network security systems have detected the transfer of unwanted (e.g. malicious, etc.) data between devices over a network. Unfortunately, these conventional network security systems have exhibited various limitations. For example, the network security systems have generally been required to hold an entire file being transferred over the network for determining whether the file is unwanted. Thus, the network security systems have functioned as a proxy on the network, resulting in limitations in performance and storage.

Further, the network security systems have oftentimes been implemented in a non-centralized manner. To this end, there has customarily been no guarantee that signatures of unwanted data utilized for detecting the transfer of unwanted data over the network are the most up-to-date. There is thus a need for addressing these and/or other issues associated with the prior art.

SUMMARY

A system, method, and computer program product are provided for preventing communication of unwanted network traffic by holding only a last portion of the network traffic. In use, network traffic associated with a file transfer is received. Additionally, only a last portion of the network traffic associated with the file transfer is held for determining whether the file is unwanted. Further, the last portion of the network traffic associated with the file transfer is conditionally forwarded to a destination device, based on the determination.

DETAILED DESCRIPTION

Figure 1:
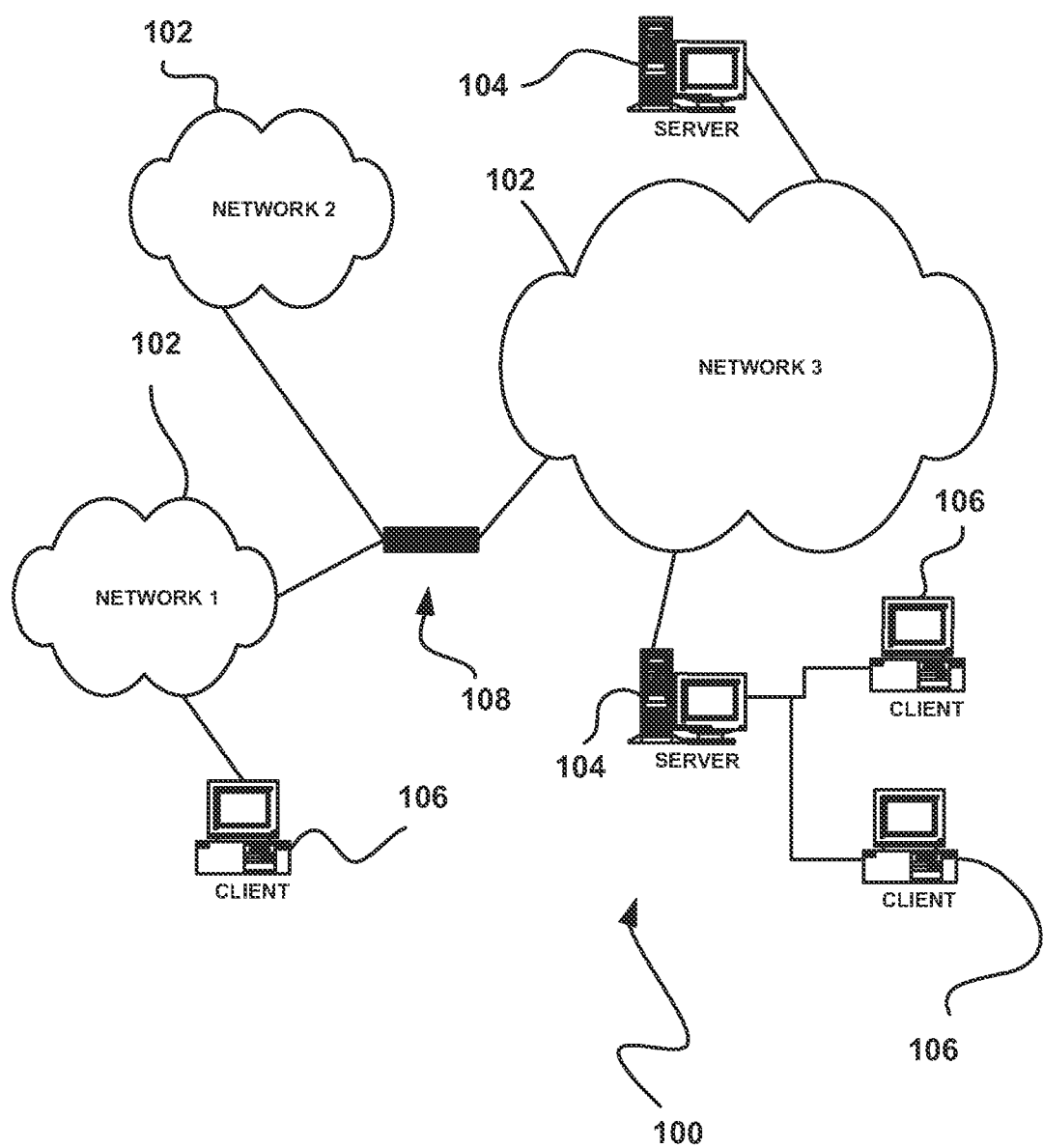
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
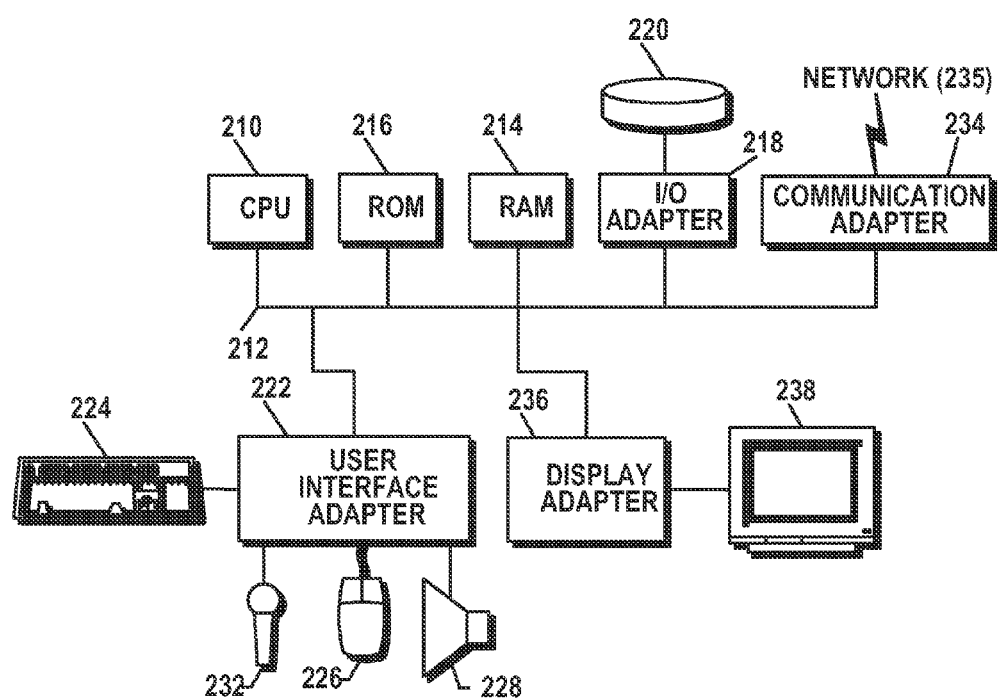
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
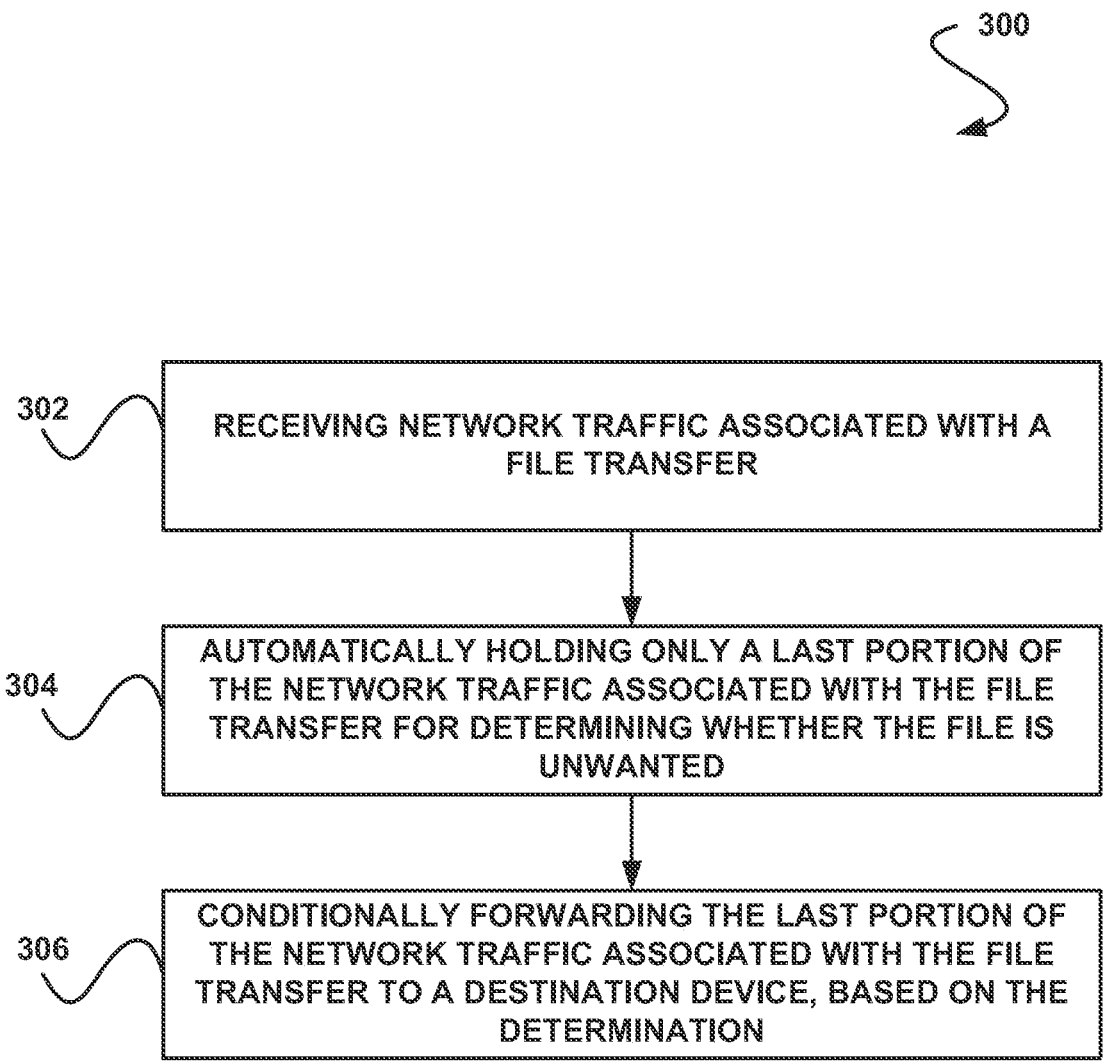
FIG. 3 shows a method for preventing communication of unwanted network traffic by holding only a last portion of the network traffic, in accordance with another embodiment.

FIG. 3 shows a method 300 for preventing communication of unwanted network traffic by holding only a last portion of the network traffic, in accordance with another embodiment. As an option, the method 300 may be carried out in the context of the architecture and environment of FIGS. 1 and/or 2. Of course, however, the method 300 may be carried out in any desired environment.

As shown in operation 302, network traffic associated with a file transfer is received. In the context of the present description, the network traffic includes any form of traffic utilized for transferring the file over a network. For example, the network traffic may include a plurality of packets, each packet utilized for transferring a different portion of the file over the network.

It should be noted that the transfer of the file may include downloading the file, in one embodiment. In another embodiment, the transfer of the file may include uploading the file. Of course, however, the file may be transferred in any manner whereby the file is sent over a network by a source device for receipt by a destination device.

Additionally, the file may include any data structure storing content. For example, the file may include an electronic document. In other examples, the file may store audio, video, text, web content, etc.

Further, as shown in operation 304, only a last portion of the network traffic associated with the file transfer is held for determining whether the file is unwanted. In this way, all portions of the network traffic associated with the file transfer may be forwarded to the destination device with the exception of the last portion of the network which is held for determining whether the file is unwanted.

In one embodiment, the last portion of the network traffic which is held may include a last packet of the network traffic. However, the last portion of the network traffic may include any subpart of the network traffic which is the last subpart capable of being received with respect to the file transfer. For example, the network traffic may be segmented based on a predetermined portion type, such as by packet, etc. for identifying the last portion of such network traffic.

It should be noted that the last portion of the network traffic may be identified in any desired manner such that the last portion of the network traffic may be held. Optionally, the last portion of the network traffic may be identified by comparing a size of the file to a size of all received potions of the network traffic. As another option, the size of the file may be indicated in a header of the network traffic (e.g. a header of each packet of the network traffic), and accordingly may be identified utilizing the header of the network traffic.

For example, as each portion of the network traffic is received, the size of all received potions of the network traffic may be updated. Furthermore, in response to each update, the size of all received portions of the network traffic may be compared with the size of the file. Once the difference between the size of all received potions of the network traffic and the size of the file is zero, it may be determined that the most recently received portion of the network traffic is the last portion of the network traffic.

Moreover, the last portion of the network traffic may be held in any manner that allows sufficient time to determine whether the file is unwanted. Just by way of example, the last portion of the network traffic may be held in cache memory. In addition, the determination of whether the file is unwanted may be performed by comparing at least one characteristic of the network traffic to characteristics of known unwanted files (e.g. files previously determined to be unwanted).

In one embodiment, information associated with the received network traffic may be identified for determining whether the file is unwanted. Such information may include a name of the file, a size of the file, a hash [e.g. MD5 (Message-Digest algorithm 5)] of the file and/or any other information associated with the receive network traffic. To this end, the information may uniquely describe the file.

Optionally, the information may be identified utilizing each received portion of the network traffic. Just by way of example, the hash of the file may be calculated based on received portions of the network traffic. As each portion of the network traffic is received, the hash of the file may be updated to reflect all received portions of the network traffic. Thus, upon receipt of the last portion of the network traffic, the hash may be updated such that the hash includes a hash of the entire file.

Furthermore, a database of known unwanted files (e.g. previously identified malicious files, such as files with viruses, spam, etc.) may be queried utilizing the information for determining whether the file is unwanted. In one embodiment, it may be determined whether the file is unwanted based on a result of the query. For example, it may be determined that the file is unwanted if the result of the query indicates that the file matches one of the known unwanted files (e.g. the hash of the file matches a hash of a known unwanted file included in the database). Optionally, if the result of the query indicates that the file matches one of the known unwanted files, the result of the query may further indicate a category of the file determined to be unwanted, a level of maliciousness of the file, an action to be taken with respect to the last portion of the network traffic being held (e.g. whether the destination device to which the last portion of the network traffic is destined should be notified of the detection of the file as unwanted, etc.).

Still yet, as shown in operation 306, the last portion of the network traffic associated with the file transfer is conditionally forwarded to the destination device, based on the determination. Thus, as an option, the last portion of the network traffic may conditionally be forwarded to the destination device based on the result of the query.

In one embodiment, the last portion of the network traffic may be forwarded to the destination device in response to a determination that the file is not unwanted. Thus, if it is not determined that the file is unwanted (e.g. and thus that the file is wanted), the last portion of the network traffic may optionally be forwarded to the destination device. By allowing the last portion of the network traffic to be forwarded to the destination device, a complete file that is not determined to be unwanted may be forwarded to the destination device.

In another embodiment, the last portion of the network traffic may not be forwarded to the destination device in response to a determination that the file is unwanted. For example, if is determined that the file is unwanted, the last portion of the network traffic may be prevented from being forwarded to the destination device (e.g. by dropping the last portion of the network traffic, etc.). In this way, the destination device may be secured from receiving the unwanted file.

Optionally, an action to be taken with respect to the last portion of the network traffic as indicated by the result of the query described above with respect to operation 304 may be performed. For example, if the action indicates that the destination device is to be notified of the detection of the file as unwanted, a notification may be sent to the destination device as instructed by the result of the query. Of course, it should be noted that the result of the query may indicate that any desired action is to be performed.

To this end, communication of unwanted network traffic may be prevented by holding only a last portion of the network traffic. By allowing all other portions of the network traffic to be forwarded with the exception of the last portion (thus preventing a requirement that all received portions of the network traffic be held), a size of the network traffic that is held may be reduced. In addition, the determination of whether the file is unwanted, and thus the conditional forwarding of the last portion of the network traffic based on such determination, may be made in real-time.

In one embodiment, the receiving, holding, and forwarding may be performed by a security system [e.g. intrusion prevention system (IPS), etc.]. The security system may be located on the network between the destination device and a source device of the network traffic (e.g. from which the network traffic was sent).

The security system may automatically intercept the network traffic, such that the network traffic may be required to be communicated through the security system. In this way, the security system may receive the network traffic from the source device and control which portions of the network traffic are forwarded on to the destination (e.g. by forwarding all portions of the network traffic and holding only the last portion of the network traffic for determining whether the file associated therewith is unwanted). Further, by operating as described in the method 300 above, the security system may detect the transfer of an unwanted file in real-time within a response time of a million seconds, and thus may operate in an inline mode at a 10 G line rate.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
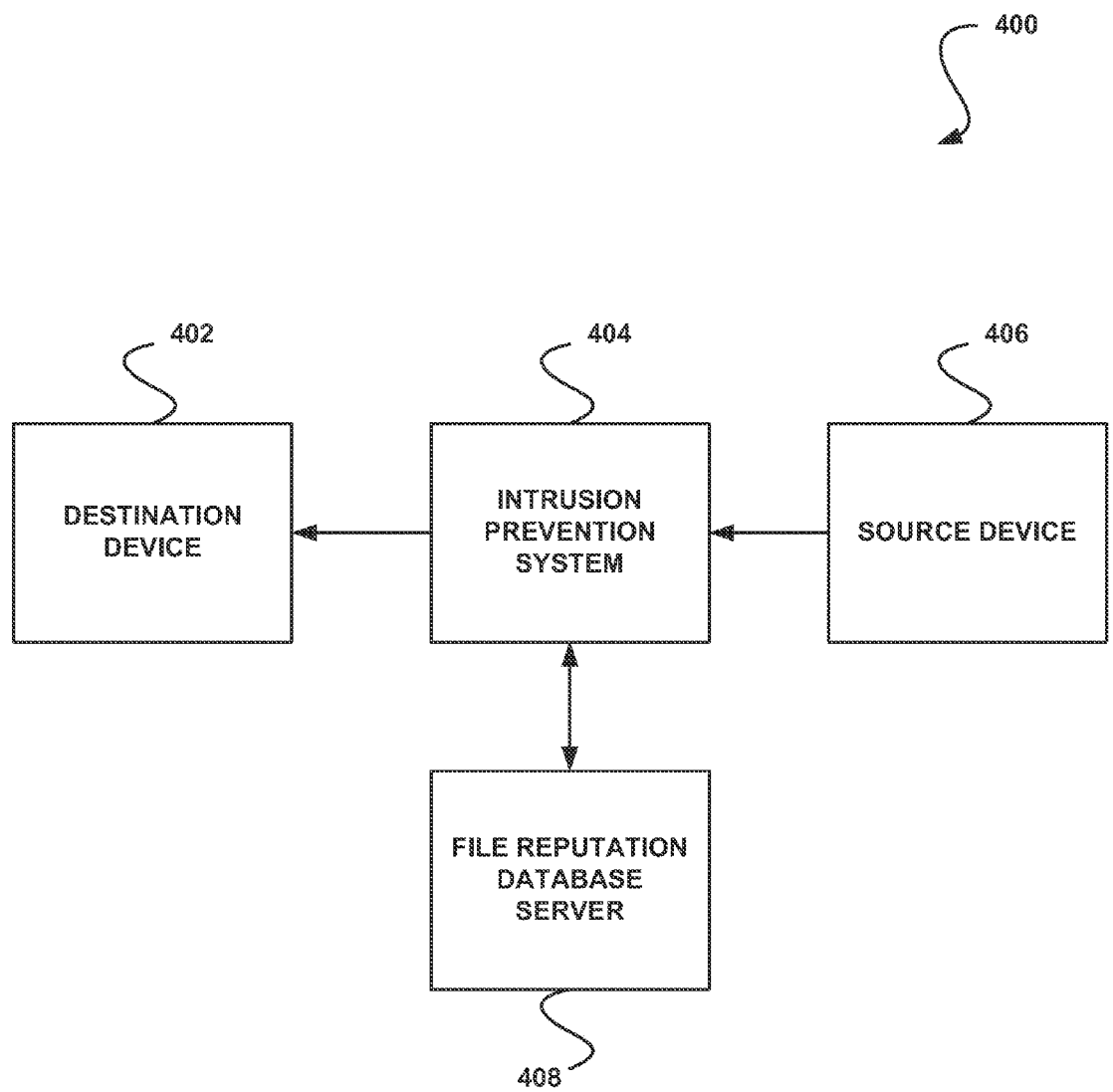
FIG. 4 shows a system for preventing communication of unwanted network traffic by holding only a last portion of the network traffic, in accordance with yet another embodiment.

FIG. 4 shows a system 400 for preventing communication of unwanted network traffic by holding only a last portion of the network traffic, in accordance with yet another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a source device 406 is in communication with a destination device 402 via an IPS 404. In the context of the present embodiment, the source device 406, destination device 402, and the IPS 404 may each include devices (e.g. server and/or client devices) on a network. Optionally, the IPS 404 may include a stand-alone device, may be located on a gateway device, etc. In another embodiment, the IPS 404 may include an inline device.

Thus, network traffic may be communicated from the source device 406 to the destination device 402 by way of the IPS 404 for transferring a file. While not shown, it should be noted that network traffic may be communicated through the IPS 404 from any number of different source devices to any number of different destination devices. In this way, the IPS 404 may include a central device via which network traffic is communicated.

Upon receipt of each of a plurality of portions of network traffic associated with a file transfer from the source device 406 at the IPS 404, the IPS 404 identifies information associated with the file. In various embodiments, the information may include a name of the file, a size of the file, a hash of all received portions of the file, etc. The IPS 404 also determines whether such portion is a last portion of the network traffic (e.g. by comparing a size of the file as indicated in a header of the network traffic with a size of all received portions of the file, etc.).

If it is determined that the particular received portion is not the last portion of the network traffic, the IPS 404 forwards such portion to the destination device 402. If, however, it is determined that the particular received portion is the last portion of the network traffic, the IPS 404 holds the last portion of the network traffic for determining whether the file is unwanted. For example, the IPS 404 may hold the last portion of the network traffic in cache.

In order to determine whether the file is unwanted, the IPS 404 may query a file reputation database server (FRDS) 408 using the information associated with the file. The FRDS 408 may store signatures of unwanted files for use in responding to the query from the IPS 404. For example, the FRDS 408 may receive the query, and compare the information to the signatures of unwanted files for determining whether there is a match between the same.

It should be noted that the FRDS 408 may be remotely located with respect to the IPS 404. For example, the FRDS 408 and the IPS 404 may only be in communication via the network. In this way, a storage capacity of the IPS 404 may be reduced by not requiring the IPS 404 to store the signatures of unwanted files. Of course, in another embodiment, the FRDS 408 may be located on the same device as the IPS 404. Further, the FRDS 408 may include a centralized database, such that it may be ensured that the FRDS 408 has the most up-to-date signatures of unwanted files.

A result of the query is then communicated from the FRDS 408 to the IPS 404. If the FRDS 408 determines that there is a match between the information and the signatures of unwanted files, the FRDS 408 may indicate such match in the query result sent to the IPS 404. However, the FRDS 408 may indicate that the file is determined to be unwanted in any desired manner.

If the FRDS 408 determines that there is not a match between the information and the signatures of unwanted files, the FRDS 408 may indicate such in the query result sent to the IPS 404. For example, the FRDS 408 may indicate that the information does not match any of the signatures of unwanted files, that the file is accordingly not determined to be unwanted, etc. Upon receipt of the result of the query from the FRDS 408, the IPS 404 may conditionally forward the last portion of the network traffic to the destination device 402 based on the query result.

In one embodiment, the IPS 404 may forward the last portion of the network traffic to the destination device 402 if the query result indicates that the file is not unwanted, does not match any of the signatures of unwanted files, etc. In such embodiment, the destination device 402 may receive all portions of the file for aggregating the same to generate the complete file.

In another embodiment, the IPS 404 may not forward the last portion of the network traffic to the destination device 402 if the query result indicates that the file is unwanted, matches any of the signatures of unwanted files, etc. For example, the IPS 404 may drop the last portion of the network traffic.

Optionally, the IPS 404 may also send a notification to the destination device 402 that the file is unwanted. For example, the FRDS 408 may also indicate in the query result an action to take with respect to the last portion of the network traffic. The action may be identified by the FRDS 408 based on a policy. The policy may be particular to the destination device 402 (e.g. may be configured by an administrator of the destination device 402), may be globally applied to network traffic going to any destination device, etc.

Figure 5:
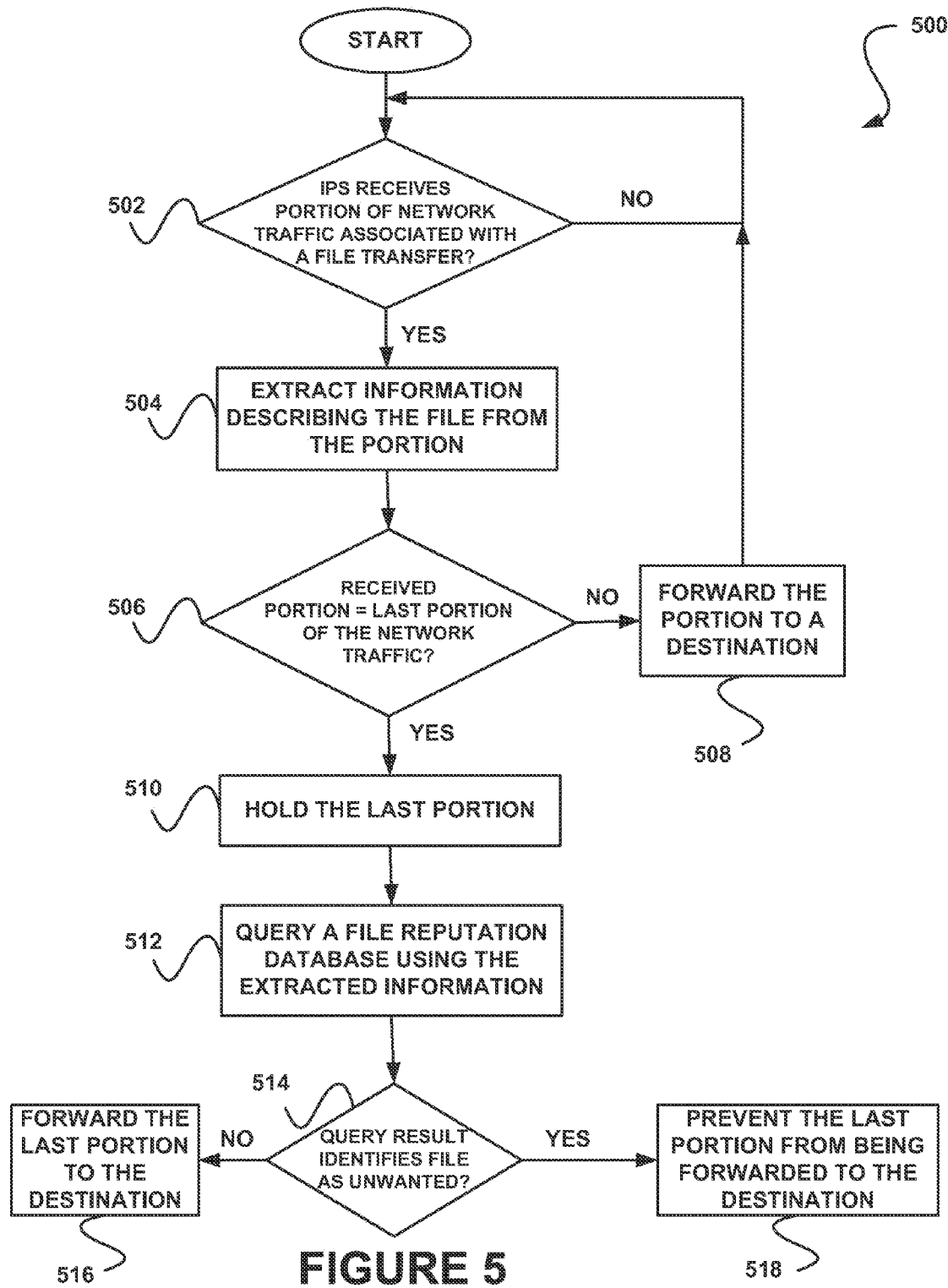
FIG. 5 shows a method for conditionally forwarding a last portion of network traffic associated with a file transfer to a destination based on a determination of whether the file is unwanted, in accordance with still yet another embodiment.

FIG. 5 shows a method 500 for conditionally forwarding a last portion of network traffic associated with a file transfer to a destination based on a determination of whether the file is unwanted, in accordance with still yet another embodiment. As an option, the method 500 may be carried out in the context of the architecture and environment of FIGS. 1-3. Of course, however, the method 500 may be carried out in any desired environment. Again, it should be noted that the aforementioned definitions may apply during the present description.

As shown in decision 502, it is determined whether an IPS receives a portion of network traffic associated with a file transfer. For example, the IPS may receive the portion of the network traffic and may determine whether such network traffic is being utilized to transfer a file. Optionally, a header of the portion of the network traffic may indicate whether the network traffic is being utilized to transfer a file, and thus may be utilized for determining whether the network traffic is being utilized to transfer a file.

In the context of the present embodiment, the IPS may receive the portion of the network traffic from a source device over a network for forwarding the portion of the network traffic to a destination device. For example, the IPS may intercept the network traffic destined for the destination device.

If it is determined that a portion of network traffic associated with a file transfer has not been received, the method 500 continues to wait for such a portion of network traffic to be received. If, however, it is determined that a portion of network traffic associated with a file transfer has been received, information describing the file is extracted from the portion. See operation 504. The information may include a name of the file being transferred, a size of the file being transferred, a hash of the portion of the file being transferred via the portion of the network traffic, etc.

Further, as shown in decision 506, it is determined whether the received portion of the network traffic includes a last portion of the network traffic. For example, the size of the file determined in operation 504 may be compared to a size of all portions of the network traffic that have been received by the IPS. If there is not a difference between the size of the file and the size of all portions of the network traffic that have been received by the IPS, it may be determined that the latest received portion of the network traffic includes a last portion of the network traffic.

If is determined that the received portion of the network traffic does not include the last portion of the network traffic, such received portion is forwarded to the destination device. See operation 508. Further, it is again determined whether a next portion of the network traffic associated with the file transfer is received (decision 502), such that information may be extracted from each received portion of the network traffic associated with the file transfer (operation 504). In this way, all portions of the network traffic, with the exception of the last portion as described below, may be automatically forwarded to the destination device.

If it is determined that the received portion of the network traffic does include the last portion of the network traffic, the last portion is held. See operation 510. For example, the last portion may be held in cache. Moreover, a file reputation database is queried using the extracted information, as shown in operation 512.

The file reputation database may store predetermined information associated with previously identified unwanted data. Thus, the query may be used to determine whether the file being transferred is unwanted by determining whether the information extracted from the received network traffic associated with the file transfer is stored in the file reputation database.

Still yet, as shown in decision 514, it is determined whether the query result identifies the file as unwanted. In one embodiment, if the information extracted from the received network traffic associated with the file transfer is stored in the file reputation database, as determined by the query, the query result may indicate that the file is unwanted. In another embodiment, if the information extracted from the received network traffic associated with the file transfer is not stored in the file reputation database, as determined by the query, the query result may indicate that the file is not unwanted (e.g. is clean, etc.).

If the query result does not identify the file as unwanted, the last portion of the network traffic is forwarded to the destination device, as shown in operation 516. In this way, all portions of the network traffic may be forwarded to the destination device. Accordingly, the destination device may receive the full file.

If the query result identifies the file as unwanted, the last portion of the network traffic is prevented from being forwarded to the destination device. See operation 518. For example, the last portion of the network traffic may be dropped by the IPS. Thus, the destination device may be prevented from receiving the full file identified as being unwanted, and may accordingly be secured from the unwanted file.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code to receive network traffic through an input port, where the network traffic is segmented into predetermined portion types and the content of the network traffic is associated with a file being transferred from a source device to a destination device,
   computer code to determine identifying information regarding the file;
   computer code to employ the identifying information to consult a file reputation database over a network;
   computer code to receive a message based upon the consultation with the file reputation database;
   computer code to prevent passage to the destination device of a last portion of network traffic until the message is received, and
   computer code to conditionally forward the last portion of the network traffic associated with the file transfer if the message does not indicate that the file is unwanted;
   wherein the last portion of network traffic comprises a positive integer quantity of the predetermined portion types.

2. The computer program product of claim 1, wherein the predetermined portion type is a packet.

3. The computer program product of claim 1 further comprising computer code to identify the last portion of network traffic by comparing a size of the file to a size of all received portions of the network traffic.

4. The computer program product of claim 1, wherein the identifying information includes a hash of the file.

5. The computer program product of claim 1 further comprising computer code to prevent forwarding the last portion of network traffic if the message indicates the file is unwanted.

6. The computer program product of claim 1, wherein the message is based at least in part upon a comparison of the identifying information with data regarding known unwanted files.

7. The computer program product of claim 1, further comprising computer code to read a network header.

8. A computer program product embodied on a non-transitory computer readable medium, comprising:
   computer code to receive network traffic associated with a file being transferred from a source device to a destination device, wherein the network traffic is segmented into predetermined portion types;
   computer code to determine information regarding the file;
   computer code to employ the information regarding the file to consult a computing resource, the consultation regarding whether the file is unwanted;
   computer code to receive from the computing resource a message, the message based upon information received over a network and the message indicating whether or not the file is unwanted;
   computer code to prevent passage to the destination device by a last portion of network traffic associated with the file transfer, until the message is received; and
   computer code to forward the last portion of the network traffic to the destination device if the message does not indicate that the file is unwanted;
   wherein the last portion of network traffic comprises a positive integer quantity of the predetermined portion types.

9. The computer program product of claim 8, wherein the predetermined portion type is a packet.

10. The computer program product of claim 8 further comprising computer code to identify the last portion of network traffic by comparing a size of the file to a size of all received portions of the network traffic.

11. The computer program product of claim 8, wherein the information regarding the file includes a hash of the file.

12. The computer program product of claim 8 further comprising computer code to prevent forwarding the last portion of network traffic, if the message indicates the file is unwanted.

13. A computer program product embodied on a non-transitory computer readable medium, comprising:
   computer code to receive network traffic through an input port, the network traffic being segmented into predetermined portion types and associated with a file being transferred to a destination device;
   computer code to determine identifying information regarding the file;
   computer code to create a query based upon the identifying information;
   computer code to employ the query to consult a database, the consultation regarding whether the file is unwanted;
   computer code to receive a query result as a response to the consultation, the query result based upon information received over a network and through a second input port, the query result also indicating whether or not the file is unwanted;
   computer code to prevent passage to the destination device of a last portion of network traffic associated with the file transfer until the query result is received; and
   computer code to forward, through an output port, the last portion of the network traffic if the query result does not indicate that the file is unwanted;
   wherein the last portion of network traffic comprise a positive integer quantity of the predetermined portion types.

14. The computer program product of claim 13, wherein the predetermined portion type is a packet.

15. The computer program product of claim 13 further comprising computer code to identify the last portion of network traffic by comparing a size of the file to a size of all received portions of the network traffic.

16. The computer program product of claim 13, wherein the identifying information includes a hash of the file.

17. The computer program product of claim 13, wherein the query result is based at least in part upon a comparison of the identifying information with data regarding known unwanted files.

18. The computer program product of claim 13, further comprising computer code to read a network header.

19. The computer program product of claim 13 further comprising computer code to prevent forwarding the last portion of network traffic if the query result indicates the file is unwanted.

20. The computer program product of claim 13, wherein the input port and the second input port are different.

* * * * *